US008272858B2

(12) United States Patent
Bollwerk et al.

(10) Patent No.: US 8,272,858 B2
(45) Date of Patent: Sep. 25, 2012

(54) PISTON PUMP

(75) Inventors: Andre Bollwerk, Steinheim an der Murr (DE); Wolfgang Schuller, Cleebronn (DE); Horst Beling, Heilbronn (DE); Juergen Wagner, Rettenberg-Freidorf (DE); Michael Schuessler, Seckach (DE); Stefan Hallermann, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 836 days.

(21) Appl. No.: 12/303,173

(22) PCT Filed: May 22, 2007

(86) PCT No.: PCT/EP2007/054952
§ 371 (c)(1),
(2), (4) Date: Dec. 2, 2008

(87) PCT Pub. No.: WO2007/147693
PCT Pub. Date: Dec. 27, 2007

(65) Prior Publication Data
US 2009/0185924 A1 Jul. 23, 2009

(30) Foreign Application Priority Data

Jun. 22, 2006 (DE) .......................... 10 2006 028 638

(51) Int. Cl.
*F04B 39/10* (2006.01)
*F04B 53/12* (2006.01)
(52) U.S. Cl. ........ 417/547; 417/440; 417/470; 417/471; 417/545; 417/549; 417/566
(58) Field of Classification Search .................. 417/566, 417/470, 471, 440, 545, 547, 549
See application file for complete search history.

(56) References Cited

U.S. PATENT DOCUMENTS

| 6,318,979 | B1 * | 11/2001 | Schuller .......................... 417/550 |
| 6,457,956 | B1 * | 10/2002 | Hauser et al. .................. 417/470 |
| 6,471,496 | B1 * | 10/2002 | Merklein et al. ............... 417/569 |
| 2001/0002978 | A1 * | 6/2001 | Siegel et al. .................... 417/470 |
| 2001/0048884 | A1 | 12/2001 | Siegel et al. |
| 2005/0063846 | A1 * | 3/2005 | Maeda ............................ 417/471 |
| 2007/0092389 | A1 * | 4/2007 | Dinkel et al. .................. 417/554 |
| 2008/0226479 | A1 * | 9/2008 | Schuller et al. ................ 417/545 |

FOREIGN PATENT DOCUMENTS

| CN | 1748084 A | 3/2006 |
| DE | 19747850 A1 | 2/1999 |
| DE | 10346237 A1 | 9/2004 |
| WO | 9906702 A1 | 2/1999 |
| WO | 2007028728 A1 | 3/2007 |

* cited by examiner

*Primary Examiner* — Nimeshkumar Patel
*Assistant Examiner* — Thomas A Hollweg
(74) *Attorney, Agent, or Firm* — Maginot, Moore & Beck

(57) ABSTRACT

The invention relates to a piston pump for conveying fluids. The piston pump includes a piston, and a pressure chamber located between an intake valve and a discharge valve. The intake valve is arranged between the pressure chamber and a low-pressure zone of the piston pump. The intake valve has a valve body, a closing element, a device for preloading the closing element, and a device for fastening the intake valve to the piston. The fastening device encompasses at least two fastening elements which protrude from the valve body toward the piston. The fastening elements are positioned at a distance from one another, and are fitted with inlets therebetween for supplying fluid. The invention further relates to a piston pump having an intake valve without a spring-biased element.

19 Claims, 4 Drawing Sheets

PISTON PUMP

CROSS-REFERENCE TO RELATED APPLICATION

This application is a 35 USC 371 application of PCT/EP 2007/054952 filed on May 22, 2007.

BACKGROUND OF THE INVENTION

1. Field of the Invention

The present invention relates to a piston pump for conveying fluids, and in particular to a piston pump for conveying liquids in vehicles, such as brake fluid or fuel.

2. Description of the Prior Art

Piston pumps in various embodiments are known from the prior art. In vehicles, piston pumps are used for instance as fuel pumps, or as pumps for supplying pressure to brake systems. A known piston pump, between an inlet valve and an outlet valve, has a work or pressure chamber, in which a pressure is built up by means of a linear motion of a piston. In order to have the most compact possible construction, the fluid is delivered to the inlet valve through a plurality of radial bores and a longitudinal bore in the piston. However, this requires metal-cutting machining of the piston, which is very complicated. It has furthermore been found that because of the delivery by the piston and the attendant relatively long travel distances for delivering the fluid, flow losses occur. Hence the known piston pump is relatively complicated in its construction and expensive to manufacture.

ADVANTAGES AND SUMMARY OF THE INVENTION

The piston pump of the invention has the advantage over the prior art that it requires only very little structural space and can be manufactured economically. Moreover, the piston pump of the invention has markedly reduced flow losses. As a result, the efficiency of the piston pump can be improved. Metal-cutting machining of the piston is furthermore unnecessary in the piston pump of the invention. The piston pump of the invention can be manufactured very economically and has only a small number of parts. As a result, the assembly costs can also be lowered by reducing the required number of assembly steps. This is attained according to the invention in that the piston pump has a piston and a pressure chamber that is disposed between an inlet valve and an outlet valve. The inlet valve is disposed between the pressure chamber and a low-pressure zone of the piston pump. The inlet valve includes a valve body with a valve seat, a closing element, a prestressing device for prestressing the closing element, and a fixation device for fastening the inlet valve to the piston. The fixation device includes at least two fixation lugs, protruding from the valve body in the direction of the piston, which are spaced apart from one another and between which, inflow openings for the inflow of the fluid are located. As a result, it is no longer necessary for inflow bores or the like to be provided in the piston. The inflow of fluid is effected according to the invention through the inflow openings between the valve body and the piston. A cross section of the inflow opening can be varied, for instance by varying a length of the fixation lugs or varying a spacing of the fixation lugs, or varying the number of fixation lugs.

Preferably, the fixation lugs are each spaced equally apart from one another along a circumference of the valve body. It should be noted that especially preferably, three or four fixation lugs are provided. As a result, an adequate cross-sectional area for the inflow of fluid can be furnished between the various fixation lugs.

In an especially preferred feature of the invention, each of the fixation lugs includes one step. The step serves as a stop for a face end of the piston, so that upon mounting of the valve body onto the piston, a defined position of the valve body on the piston is always obtained. As a result, errors in assembly can also be avoided. Moreover, as a result of the graduation, a press fit between the piston and the valve body can be achieved.

To make especially economical production possible, the piston is preferably a cylindrical roll of a solid material, in particular a metal material.

To make fast and simple assembly possible, a fastening of the fixation lugs to the piston is preferably done by nonpositive engagement, in particular via a press fit.

The valve body is especially preferably made from a plastic material. As a result, production costs can be reduced, since the valve body can be produced economically by an injection-molding process.

In a preferred feature of the invention, the prestressing device of the inlet valve is a spring, in particular a spiral spring, which is braced on a cage disposed on the valve body. The cage is preferably formed in one piece with the valve body. As a result, the number of parts can be reduced.

In an alternative feature, the prestressing device includes many elastic prestressing lugs, which retain the closing element. By elastic deformation of the prestressing lugs, the inlet valve can be opened. Beyond a predetermined opening pressure, the prestressing lugs deform, and they close the inlet valve again once the opening pressure has dropped below the predetermined value. For holding the closing element, the prestressing lugs preferably have an undercut. Also preferably, the prestressing lugs are formed in one piece with the valve body.

The present invention further relates to a piston pump for conveying fluids, including a piston and a pressure chamber that is located between an inlet valve and an outlet valve. The inlet valve includes a valve body, a closing element, and a prestressing device for prestressing the closing element; the prestressing device of the inlet valve includes many elastic prestressing elements. The elastic prestressing elements take on a function of a restoring spring for the inlet valve. The prestressing elements preferably have an undercut for holding the closing element and are moreover preferably formed in one piece with a valve body of the inlet valve. The prestressing elements are preferably made from a plastic material.

A closing element of a piston pump of the invention is preferably a ball or a plate.

Also preferably, a sealing element for sealing off the pressure clamber from a low-pressure zone of the piston pump is additionally disposed on the valve body.

BRIEF DESCRIPTION OF THE DRAWINGS

Preferred exemplary embodiments of the invention are described below in conjunction with the accompanying drawings, in which.

DESCRIPTION OF THE PREFERRED EMBODIMENTS

A piston pump 1 in a first exemplary embodiment of the invention will be described below with reference to FIGS. 1 through 5.

Figure 1:
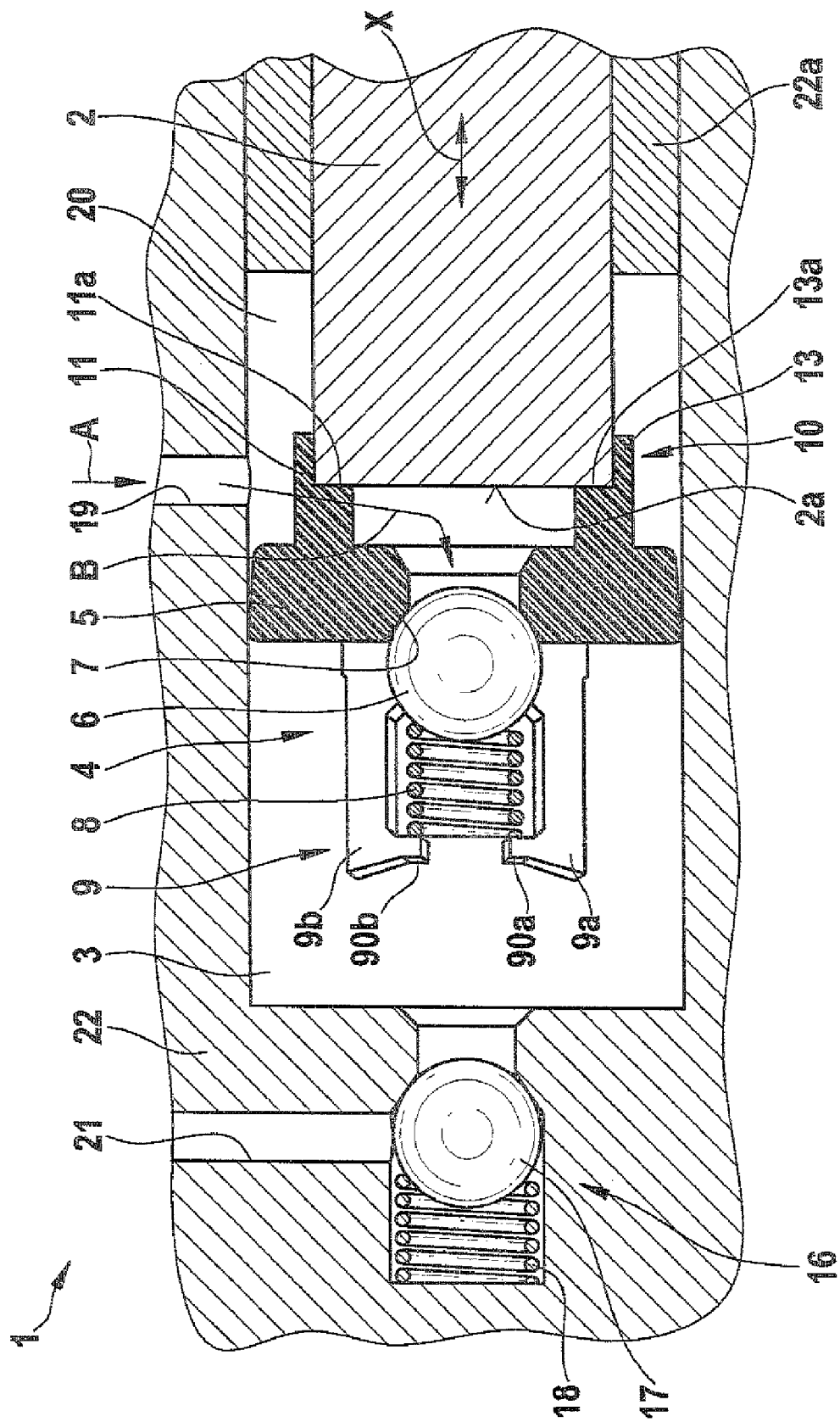
FIG. 1 is a schematic sectional view of a piston pump in a first exemplary embodiment of the invention.
Figure 2:
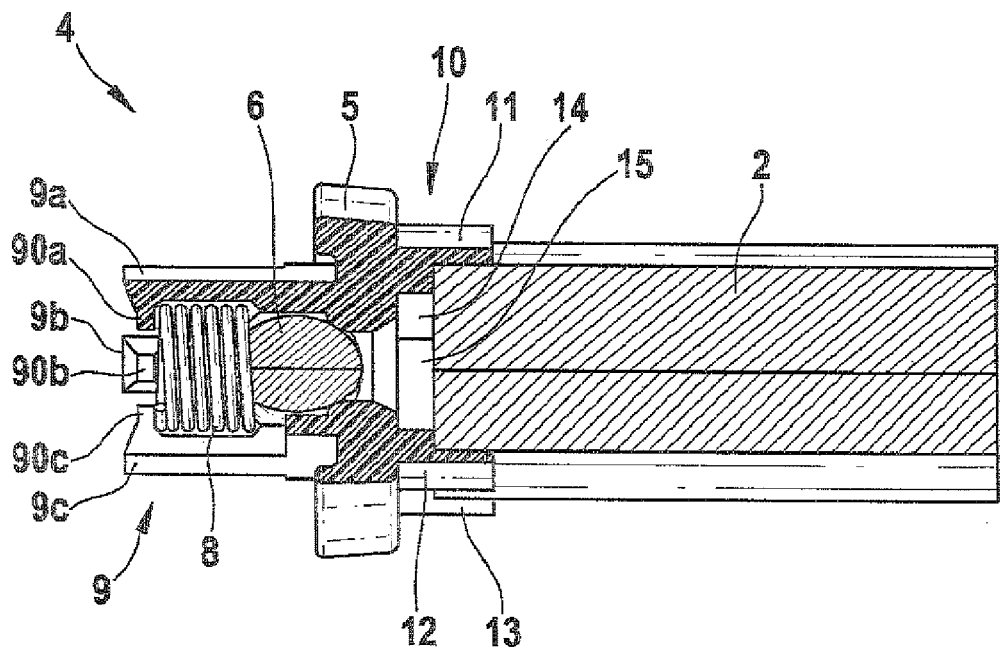
FIG. 2 is a view, partly in section, of a piston preassembled with an inlet valve.
Figure 3:
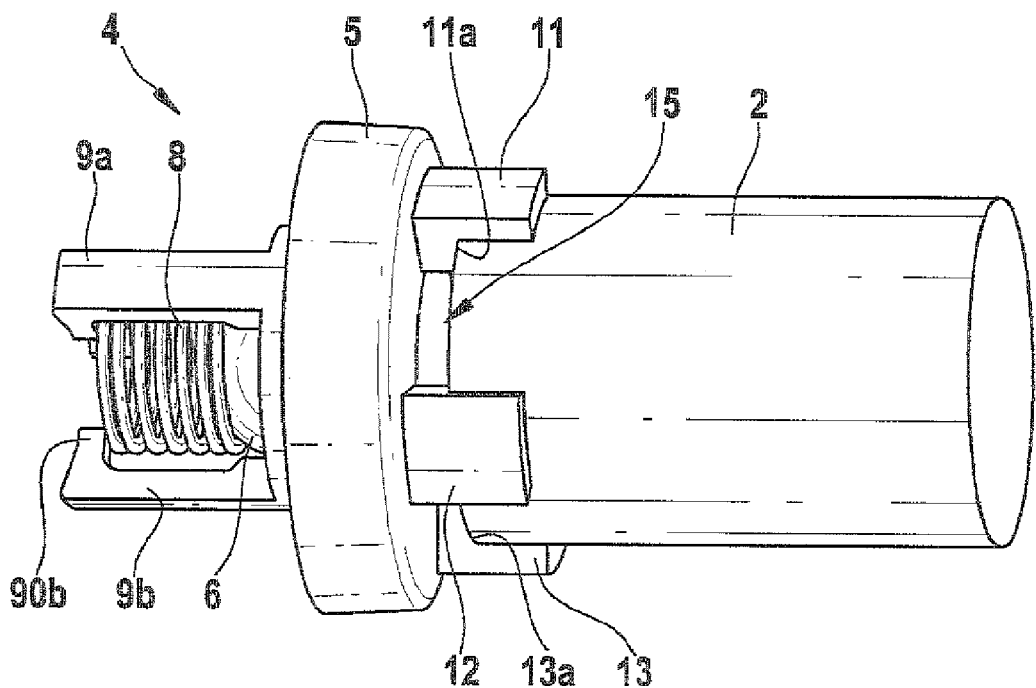
FIG. 3 is a perspective view of FIG. 2.
Figure 4:
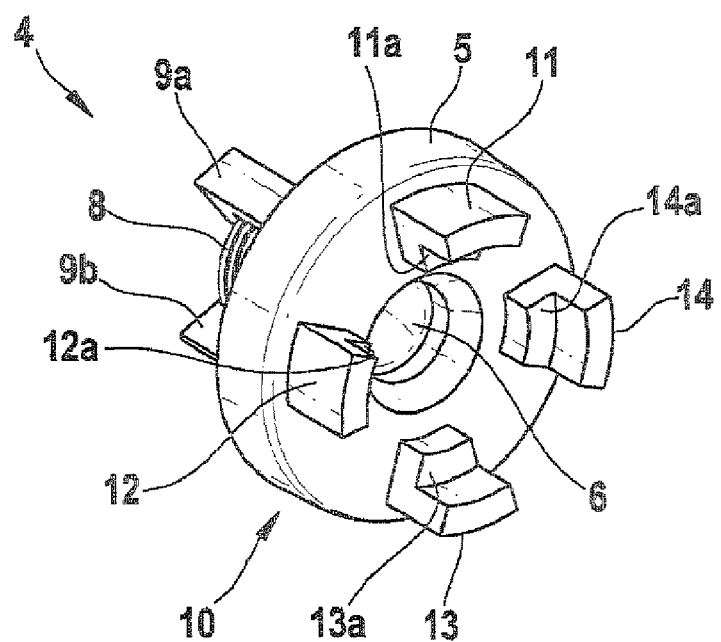
FIG. 4 is a perspective view of an inlet valve.
Figure 5:
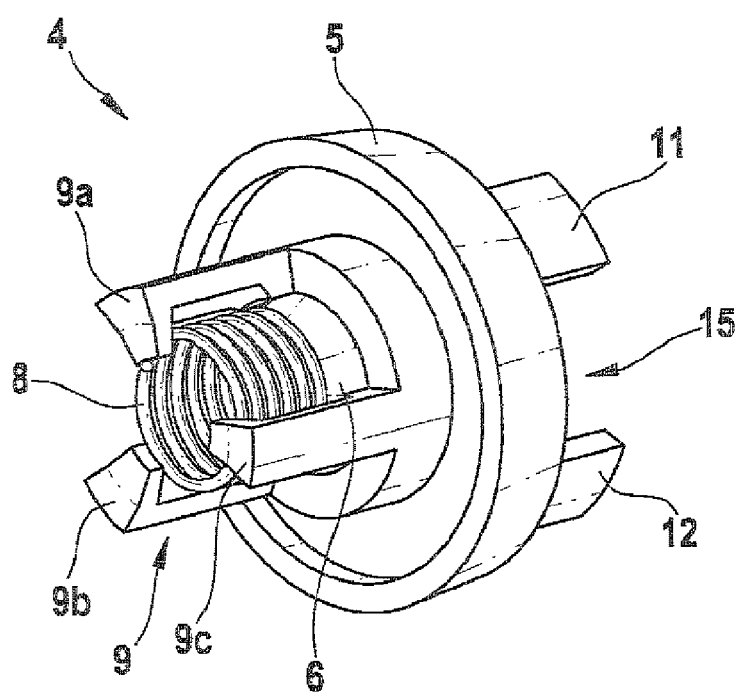
FIG. 5 is a perspective view of the inlet valve of FIG. 4 from a different direction.

As can be seen from FIG. 1, the piston pump 1 includes a piston 2, which is made from a solid material as a cylindrical roll. The piston 2 is guided movably back and forth (double arrow X in FIG. 1) on a housing 22 in a sleeve 22*a* and is driven for instance by means of a cam for example (not shown). The piston pump 1 furthermore includes an inlet valve 4, an outlet valve 16, and a pressure chamber 3 disposed between the inlet valve 4 and the outlet valve 16.

The inlet valve 4 includes a valve body 5, which is made from a plastic material. The inlet valve 4 furthermore includes a closing element 6, which in this exemplary embodiment is a ball. The closing element 6 either seals off a valve seat 7 that is formed on the valve body 5 or opens the valve seat. The closing element 6 is prestressed against the valve seat 7 by means of a cylindrical spring 8. The cylindrical spring 8 is braced on a cage 9 that is formed integrally with the valve body 5. The cage includes three arms 9*a*, 9*b*, 9*c*, which can be seen particularly in FIGS. 2 and 5. Each of the arms 9*a*, 9*b*, 9*c* has a respective projection 90*a*, 90*b*, 90*c*, that protrudes inward, against which the cylindrical spring 8 is braced. The inlet valve 4 furthermore includes a fixation device 10, for fastening the inlet valve 4 to the piston 2. As can be seen from FIGS. 1 and 4, the fixation device 10 includes many fixation elements. In this exemplary embodiment, the fixation device 10 includes four fixation elements 11, 12, 13, 14. The fixation elements 11, 12, 13, 14 protrude axially from the valve body 5 in the direction of the piston 2 and are connected to the piston 2 via a press fit. The fixation elements 11, 12, 13, 14 each have a respective step 11*a*, 12*a*, 13*a*, 14*a*, for forming a stop for an end face 2*a* of the piston 2. The fixation elements 11, 12, 13, 14 are each spaced equally apart from one another. As a result, one inflow opening 15 is formed between each two adjacent fixation elements 11, 12, 13, 14, so that a total of four inflow zones are formed.

As can be seen from FIG. 1, the inlet valve separates the pressure chamber 3 from a low-pressure zone 20. The low-pressure zone 20 in this exemplary embodiment forms an annular conduit, to which fluid is delivered, as indicated by the arrow A, via an intake conduit 19.

In the intake phase of the piston pump, the fluid thus flows through the four inflow openings 15, which are formed between the fixation elements 11, 12, 13, 14, and past the open closing element 6 into the pressure chamber 3. This is represented in FIG. 1 by the arrow B.

The outlet valve 16 includes both a closing element 17 and a spring 18. The outlet valve 16 is embodied as a check valve, and it opens as soon as a predetermined pressure in the pressure chamber 3 is reached. The fluid can then be delivered through the opened outlet valve 16 into the pressure conduit 21 and from there for instance to the wheel brakes of a vehicle.

The function of the piston pump 1 of the invention is as follows. In the intake phase, the outlet valve 16 is closed and the inlet valve 4 is open. Since the inlet valve 4 is completely fastened to the pressure chamber end of the piston 2, the inlet valve 4 moves together with the piston 2 away from the outlet valve 16. In the intake phase, fluid is thus delivered through the intake conduit 19, the inflow openings 15, and the opened inlet valve into the pressure chamber 3. This is represented in FIG. 1 by the arrows A and B. At bottom dead center, the direction of motion of the piston 2 reverses, and the pressure buildup phase begins. In it, the inlet valve 4 is closed, and the pressure buildup takes place in the pressure chamber 3 counter to the closed outlet valve. As soon as a predetermined opening pressure, which is determined by the prestressing force of the outlet valve spring 18 and the contrary pressure applied, is reached, the outlet valve 16 opens, and the fluid that is under pressure can flow out of the pressure chamber 3 into the pressure conduit 21 via the opened outlet valve 16.

The piston pump of the invention thus has an especially simple construction. The inflow of fluid to the pressure chamber 3 is thus effected through the inflow openings 15 between the inlet valve 4 and the piston 2. The inlet valve 4 can be premounted as a preassembled structural unit onto the piston 2. Thus a structural unit including the inlet valve 4 and the piston 2 can be furnished in the form of a preassembled unit. Since the valve body 5 and the fixation device 10 as well as the cage 9 are embodied in one piece, the number of components can be reduced. This reduces the number of assembly steps required. The valve body 5 may for instance be produced by injection molding.

According to the invention, the flow losses upon the inflow of the fluid into the pressure chamber 3 can furthermore be reduced, since the inflow no longer takes place via the bores that are present in the piston in the prior art. As the piston 2, a needle roll, which can be furnished simply and inexpensively, can for instance be used.

The piston pump 1 of the invention can be used as both a pressure pump and a suction pump.

Figure 6:
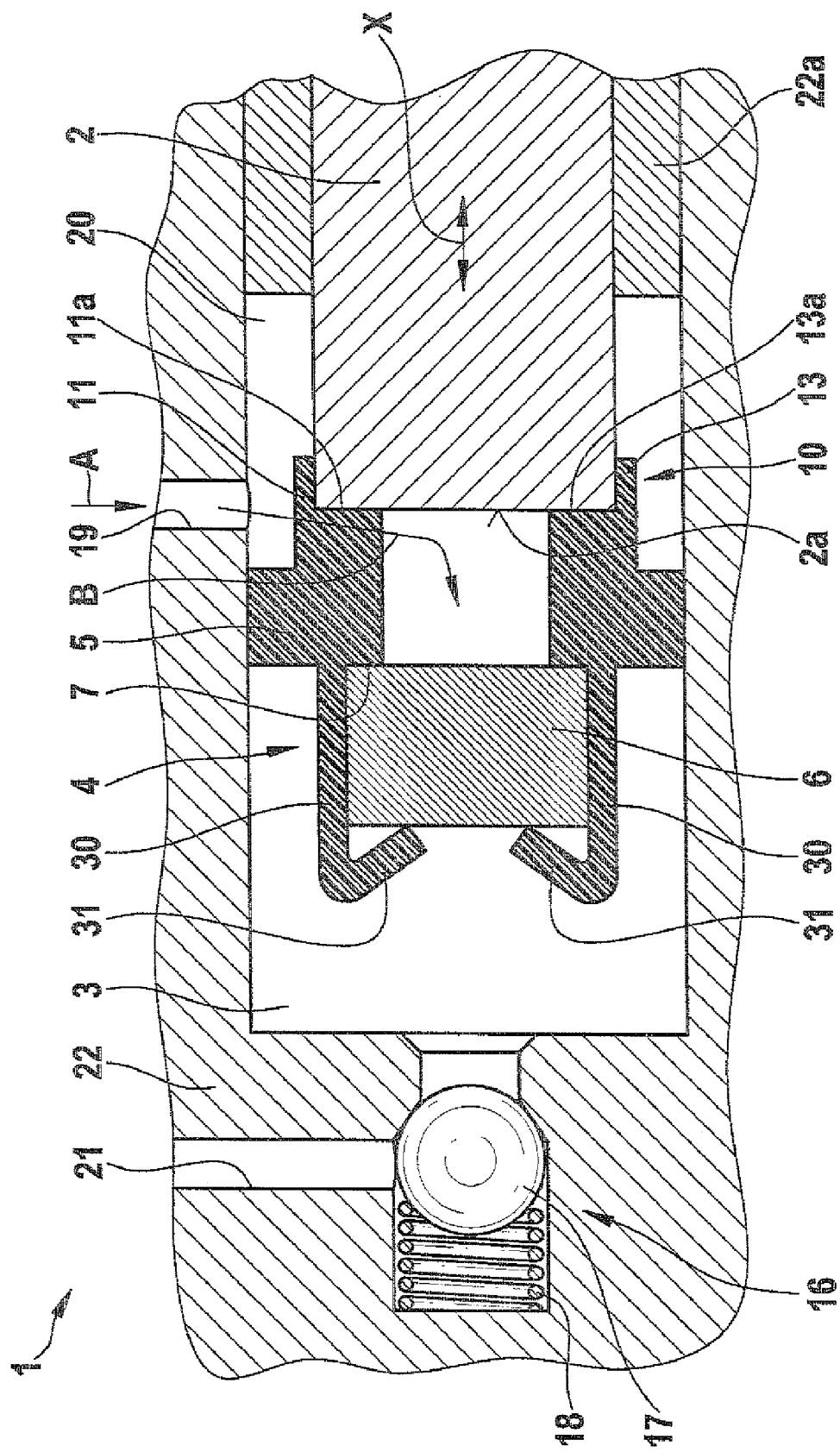
FIG. 6 is a schematic sectional view of a piston pump in a second exemplary embodiment of the invention.

Below, in conjunction with FIG. 6, a piston pump 1 in a second exemplary embodiment of the invention will be described. Elements that are identical or function identically are identified by the same reference numerals as in the first exemplary embodiment.

The second exemplary embodiment corresponds essentially to the first exemplary embodiment, but in a distinction from it, the inlet valve 4 is constructed differently. The inlet valve 4 of the second exemplary embodiment no longer has any spring element. Instead, the inlet valve 4 of the second exemplary embodiment has a plurality of elastic prestressing elements 30, which each include an inward-pointing prestressing lug 31. A closing element 6 of the second exemplary embodiment is moreover embodied as a plate. The elastic prestressing elements 30 are formed in such a way that when the closing element 6 lifts from its valve seat 7 in the valve body 5, an elastic deformation of the prestressing elements 30 or prestressing lugs 31 takes place. The elastic deformation can take place both at the prestressing lugs 31 and in the zone of connection between the prestressing lugs 31 and the valve body 5. The travel distance of the closing element 6 in the axial direction upon opening is relatively short. The closure of the inlet valve 4 is then effected via the restoring force of the prestressing elements 30, which return to their outset position again, and in the process they press the closing element 6 against the valve seat 7.

The inflow of the fluid is effected, as in the first exemplary embodiment, through the inflow openings 15 between the fixation elements 11, 12, 13, 14 of the fixation device 10. The piston pump of the second exemplary embodiment has a very compact construction, especially in the axial direction. Moreover, by dispensing with a spring element for the inlet valve, the number of parts is reduced still further. The prestressing elements 30 are again formed in one piece with the valve body 5, so that this component can be produced for instance by plastic injection molding.

Otherwise, the second exemplary embodiment is equivalent to the first exemplary embodiment, so that the description of the latter can be referred to.

The foregoing relates to the preferred exemplary embodiments of the invention, it being understood that other variants and embodiments thereof are possible within the spirit and scope of the invention, the latter being defined by the appended claims.

The invention claimed is:

1. A piston pump for conveying fluids, comprising:
an inlet valve and an outlet valve;
a piston having a length and an outer circumferential surface, said piston further having a constant diameter throughout its entire length;
a pressure chamber disposed between the inlet valve and the outlet valve, wherein the inlet valve is disposed between the pressure chamber and a low-pressure zone of the piston pump, and wherein the inlet valve includes a valve body, a closing element, a prestressing device for prestressing the closing element;
said prestressing device being braced on a cage disposed on the valve body,
a fixation device for fastening the inlet valve to the piston, the fixation device including at least two fixation elements, each fixation element protruding from the valve body toward the piston, the fixation elements being spaced apart from one another and having inflow openings therebetween for an inflow of fluid, and
said valve body, said fixation elements, and said cage being formed as a unitary, one-piece construction.

2. The piston pump as defined by claim 1, wherein the fixation elements are each spaced apart equally from one another along a circumference of the valve body.

3. The piston pump as defined by claim 2, wherein the fixation elements each have a step which serves as a stop for a face end of the piston.

4. The piston pump as defined by claim 1, wherein the fixation elements each have a step which serves as a stop for a face end of the piston.

5. The piston pump as defined by claim 1, wherein the fixation elements of the fixation device are fastened to the piston by nonpositive engagement.

6. The piston pump as defined by claim 1, wherein the valve body is made from a plastic material.

7. The piston pump as defined by claim 1, wherein the prestressing device of the inlet valve is a spring.

8. The piston pump as defined by claim 1, wherein the prestressing device of the inlet valve includes a plurality of elastic prestressing elements which are disposed on the valve body and which prestress the closing element against a valve seat on the valve body, wherein the prestressing elements have prestressing lugs which retain the closing element.

9. The piston pump as defined by claim 1, wherein the closing element is embodied as a ball or a plate.

10. The piston pump as defined by claim 1, wherein the valve body includes a sealing element for sealing the pressure chamber off from a low-pressure zone of the piston pump.

11. A piston pump for conveying fluids, comprising: an inlet valve and an outlet valve; a piston having a length and an outer circumferential surface, said piston further having a constant diameter throughout its entire length; a pressure chamber disposed between the inlet valve and the outlet valve, wherein the inlet valve includes a valve body, a closing element, and a prestressing device for prestressing the closing element against a valve seat, and wherein the prestressing device of the inlet valve includes a plurality of elastic prestressing elements, and a fixation device for fastening the inlet valve to the piston, the fixation device including at least two fixation elements, each fixation element protruding from the valve body toward the piston, the fixation elements being spaced apart from one another and having inflow openings there between for an inflow of fluid, wherein said valve body and said prestressing elements are formed as a unitary, one-piece construction.

12. The piston pump as defined by claim 11, wherein the closing element is embodied as a ball or a plate.

13. The piston pump as defined by claim 11, wherein the valve body includes a sealing element for sealing the pressure chamber off from a low-pressure zone of the piston pump.

14. The piston pump as defined by claim 11, wherein the closing element is a plate.

15. The piston pump as defined by claim 11, wherein each lug directly contacts the closing element.

16. The piston pump as defined by claim 11, wherein each lug is attached to an end of a prestressing element.

17. A piston pump for conveying fluids, comprising: an inlet valve and an outlet valve, said inlet valve having no spring; a piston having a length and an outer circumferential surface, said piston further having a constant diameter throughout its entire length; a pressure chamber disposed between the inlet valve and the outlet valve, wherein the inlet valve includes a valve body, a closing element, and a prestressing device for prestressing the closing element against a valve seat, and wherein the prestressing device of the inlet valve includes a plurality of elastic prestressing elements, and a fixation device for fastening the inlet valve to the piston, the fixation device including at least two fixation elements, each fixation element protruding from the valve body toward the piston, the fixation elements being spaced apart from one another and having inflow openings there between for an inflow of fluid, wherein each elastic prestressing element extends axially from said valve body and has an inward-pointing prestressing lug attached thereto.

18. The piston pump as defined by claim 17, wherein each lug directly contacts the closing element.

19. The piston pump as defined by claim 17, wherein each lug is attached to an end of a prestressing element.

* * * * *